United States Patent [19]

Yamauchi et al.

[11] Patent Number: 4,962,711
[45] Date of Patent: Oct. 16, 1990

[54] METHOD OF BURNING SOLID FUEL BY MEANS OF A FLUIDIZED BED

[75] Inventors: Yasuhiro Yamauchi, Nagasaki; Yoshihisa Arakawa, Tokyo; Yukihisa Fujima, Nagasaki; Kiyomasa Takenaga, Nagasaki; Hirokazu Hino, Nagasaki, all of Japan

[73] Assignee: Mitsubishi Jukogyo Kabushiki Kaisha, Tokyo, Japan

[21] Appl. No.: 293,833

[22] Filed: Jan. 5, 1989

[30] Foreign Application Priority Data

Jan. 12, 1988 [JP] Japan ................................. 63-3085

[51] Int. Cl.$^5$ ............................................. F23D 1/00
[52] U.S. Cl. .................................. 110/347; 122/4 D; 110/245
[58] Field of Search ................ 122/4 D; 431/7; 110/245, 347; 165/104.16; 422/139

[56] References Cited

U.S. PATENT DOCUMENTS

| | | | |
|---|---|---|---|
| 4,111,158 | 9/1978 | Reh et al. | 122/4 D |
| 4,165,717 | 8/1979 | Reh et al. | 122/4 D |
| 4,704,084 | 11/1987 | Liu et al. | 110/347 |
| 4,744,312 | 5/1988 | Narisoko et al. | 110/245 |
| 4,771,712 | 9/1988 | Engstrom et al. | 110/245 |
| 4,773,339 | 9/1988 | Garcia-Mallol | 110/245 |
| 4,809,625 | 3/1989 | Garcia-Mallol | 110/245 |
| 4,827,723 | 5/1989 | Engstrom et al. | 122/4 D |

Primary Examiner—Henry A. Bennet
Assistant Examiner—Denise Ferensic
Attorney, Agent, or Firm—Wenderoth, Lind & Ponack

[57] ABSTRACT

The known method of burning solid fuel by means of a fluidized bed is improved so as to reduce the amount of generated $NO_x$ and to enhance the efficiency of combustion. Primary air, secondary air and tertiary air are respectively fed through a primary air feed port opening at the fluidized bed, through a secondary air feed port opening at a free board downstream of the fluidized bed and through a tertiary air feed port opening downstream of the secondary air feed port. The feed rates of the primary air, secondary air and tertiary air are respectively controlled so that the air ratios with respect to the theoretical amount of air after charging of the primary air, after charging of the secondary air and after charging of the tertiary air may become about 0.6–0.8, about 0.8–1.0 and about 1.0 or higher, respectively. Preferably, unburnt ash sputtered from the fluidized bed is recirculated into the fluidized bed.

2 Claims, 3 Drawing Sheets

METHOD OF BURNING SOLID FUEL BY MEANS OF A FLUIDIZED BED

BACKGROUND OF THE INVENTION

1. Field of the Invention

The present invention relates to improvements in a method of burning solid fuel such as coal, oil coke, oil shale, etc. by means of a fluidized bed.

2. Description of the Prior Art

The known method of burning solid fuel by means of a fluidized bed will be described with reference to FIG. 6. In this figure, primary air is charged through a primary air feed port opening at the bottom of a fluidized bed 1 containing fluidizable material such as sand, limestone, etc. to fluidize such fluidizable material, and solid fuel to be burned such as coal or the like, is charged through a fuel charging port 3. The temperature of the fluidized bed 1 is controlled by flowing water or steam through a heat transfer tube 4 provided within the fluidized bed 1. In addition, in a free board 5 is disposed a convection heat transfer section 6, through which water or steam is made to flow to collect thermal energy from a waste gas or gas of combustion. In addition, for the purpose of suppressing the amount of $NO_x$ generated during combustion and suppressing the exhaust of CO, secondary air is charged through secondary air feed ports 7. Normally, the fluidized bed 1 is operated under a condition where an air ratio with respect to a theoretical amount of air for complete combustion resulting from the primary air is about 1.0 in order to suppress the generation of CO. This reason is because, as fluidized bed combustion is effected at a relatively low temperature of 800°–900° C., the temperature of the free board 5 becomes as low as 500°–700° C., and hence if solid fuel is burnt at the fluidized bed with a low air ratio of 1.0 or lower, then the inconvenience would arise that the generated CO would not be perfectly burnt even by means of the secondary air, and CO would be exhausted. Therefore, under a practical operating condition, the limit of lowering the air ratio with respect to a theoretical amount of air resulted from the primary air at the fluidized bed 1 is about 1.0. Hence the fluidized bed will not become a reducing atmosphere, and as a result, the amount of generated $NO_x$ will become large (150–250 ppm (equivalent to 6% $O_2$)).

It is to be noted that unburnt ash sputtered from the fluidized bed is captured by means of a cyclone 8 or the like and stored in a hopper 9. For the purpose of enhancing efficiency of combustion, part of the captured unburnt ash is recirculated to the fluidized bed 1 through an unburnt ash feeder 10 and circulation piping 11 at a recycling ratio of 0.1–0.5 kg/kg coal, but the remainder of the ash is exhausted externally through an ash extraction port 12.

The unburnt ash is separated in the cyclone 8, and combustion exhaust gas is exhausted externally from a cyclone outlet 13.

According to the above-described method of burning by means of a fluidized bed in the prior art, the following performance is generally attained:

1 the amount of generated $NO_x$ is 150–250 ppm (equivalent to 6% $O_2$), and
2 the efficiency of combustion is 90–95%.

The above-mentioned limitations of performance attainable by the combustion method in the prior art, are not satisfactory.

SUMMARY OF THE INVENTION

It is therefore one object of the present invention to provide an improved method of burning solid fuel by means of a fluidized bed, wherein the amount of generated $NO_x$ is small and the efficiency of combustion is high.

According to one feature of the present invention, there is provided a method of burning solid fuel by means of a fluidized bed, including feeding primary air through a primary air feed port opening into the fluidized bed so that an air ratio with respect to a theoretical amount of air within the fluidized bed will be about 0.6–0.8, feeding secondary air through a secondary air feed port opening onto a free board downstream of the fluidized bed so that an air ratio with respect to a theoretical amount of air after charging of the secondary air will be about 0.8–1.0, feeding tertiary air through a tertiary air feed port opening downstream of the secondary air feed port into the free board so that an air ratio with respect to a theoretical amount of air after charging of the tertiary air will be about 1.0 or higher, and recirculating unburnt ash sputtered from the fluidized bed back into the fluidized bed.

According to the present invention, owing to the fact that, in addition to the heretofore used secondary air feed port, a tertiary air feed port is provided at the free board in a fluidized bed combustion furnace, and the air ratio with respect to a theoretical amount of air established by the primary air within the fluidized bed is made to be about 0.6–0.8, the inside of the fluidized bed is brought into a reducing combustion state lacking air, and thereby generation of $NO_x$ is suppressed. Unburnt gas generated in the fluidized bed is partly burnt by charging secondary air through the secondary air feed port opening into the free board downstream of the fluidized bed, and becomes 900°–1100° C. Even after charging of the secondary air, the air ratio with respect to the theoretical amount of air is about 0.80–1.0, i.e. still a reducing atmosphere. Moreover, due to the high temperature of 900° C. or higher in this region, reduction of $NO_x$ and decomposition a reaction of $NH_3$ and HCN will occur. Thereafter, by charging tertiary air through the tertiary air feed port opening downstream of the secondary air feed port into the free board, unburnt CO is burnt, and thus combustion is completed.

The recirculation of unburnt ash sputtered from the fluidized bed not only enhances the efficiency of combustion, but also produces a further intense reducing atmosphere within the fluidized bed by charging unburnt carbon into the fluidized bed, and thus is effective for reducing $NO_x$.

With regard to the temperature within the fluidized bed, the lower the temperature, the more the amount of $NO_x$ generated in the fluidized bed can be suppressed. Thus, a lower temperature is preferable in view of suppression of the amount of generated $NO_x$.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Now a method of burning solid fuel by means of a fluidized bed according to one preferred embodiment of the present invention will be described with reference to FIG. 1.

Figure 1:
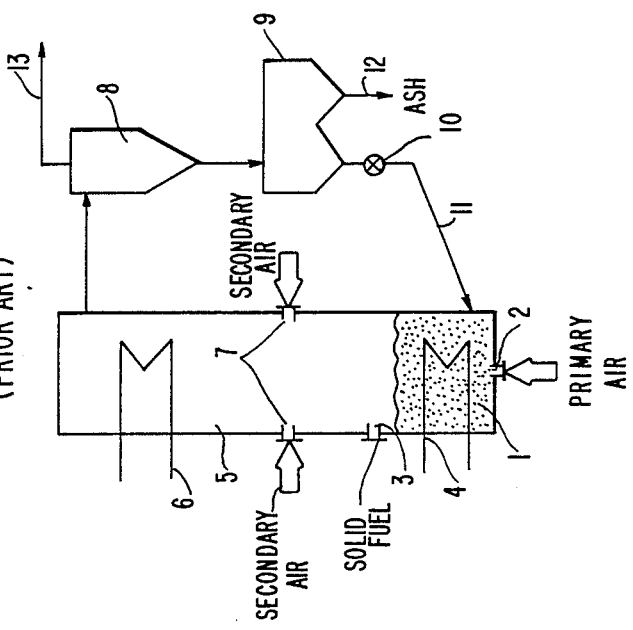
FIG. 1 is a schematic view showing a method of burning solid fuel by means of a fluidized bed according to one preferred embodiment of the present invention.
Figure 6:
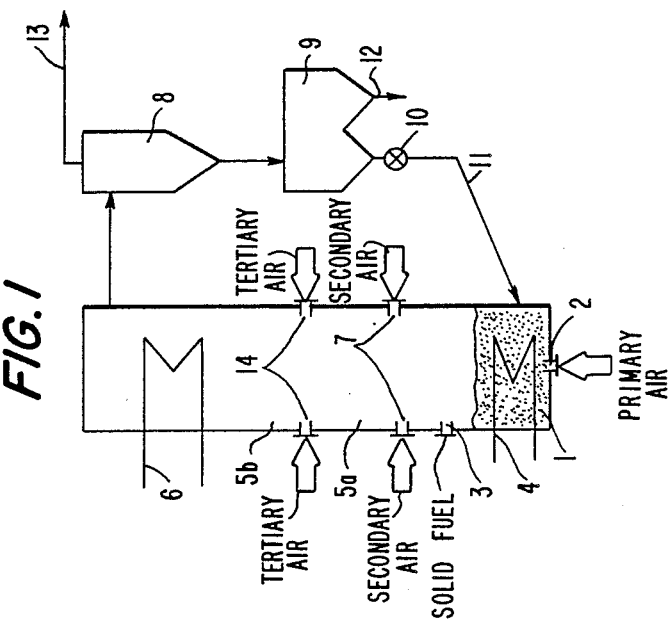
FIG. 6 is a schematic view showing a method of burning solid fuel by means of a fluidized bed in the prior art.

In FIG. 1, component parts denoted by reference numerals identical to those used in FIG. 6 have the same functions and names. Referring now to FIG. 1, primary air is charged through a primary air feed port 2 at the bottom of a fluidized bed 1 containing fluidizable material (sand, limestone, etc.) to fluidize such fluidizable material, and then solid fuel such as coal or the like is charged through a fuel charging port 3. The feed rate of the primary air is adjusted by means of a control device not shown so that an air ratio with respect to a theoretical amount of air within the fluidized bed 1 may become 0.6–0.8.

The temperature within the fluidized bed 1 is maintained at 800°–1000° C. by regulating a fluid flow rate to a heat transfer tube 4 provided within the fluidized bed 1.

In the fluidized bed 1, since the air ratio with respect to a theoretical amount of air is 0.6–0.8, i.e. meaning a reducing atmosphere, unburnt gas is generated, but a part of this unburnt gas is burnt by secondary air charged through secondary air feed ports 7 opening in the neighborhood of a lower free board 5a downstream of the fluidized bed 1. As a result, the temperature at the lower free board 5a becomes about 900°–1100° C. It is to be noted that the air ratio with respect to a theoretical amount of air at this portion is regulated at about 0.8–1.0 by adjusting the amount of air charged through the secondary air feed ports 7.

Furthermore, for the purpose of combustion of any residual unburnt gas (mainly CO), tertiary air is charged through tertiary air feed ports 14 opening in the neighborhood of an upper free board 5b downstream of the fluidized bed 1. Combustion is completed at the upper free board 5b.

It is to be noted that the air ratio with respect to a theoretical amount of air after charging of the tertiary air is regulated to be about 1.0 or higher by adjusting the feed rate of the tertiary air.

The combustion exhaust gas is discharged to the atmosphere from a cyclone outlet 13, after it has been cooled by a convection heat transfer section 6 and separated from unburnt ash in a cyclone 8. The unburnt ash separated in the cyclone 8 is stored in a hopper 9, and thereafter it is returned to the fluidized bed 1 at a recycle ratio of one or higher through an unburnt ash feeder 10 and the circulation piping 11. In addition, the ash corresponding to an ash content in the coal charged into the combustion system is ejected externally through an ash extraction port 12 of the hopper 9.

Figure 2:
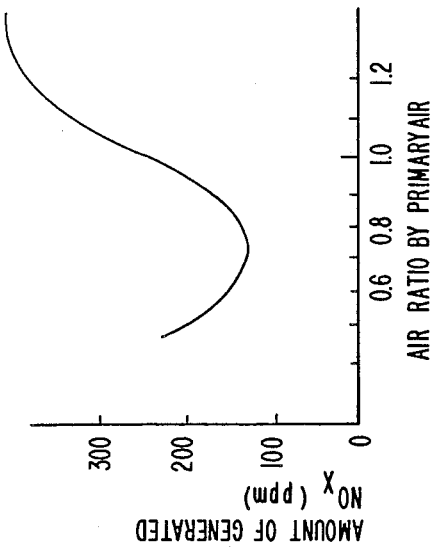
FIG. 2 is a diagram showing a relation between an air ratio established by primary air and an amount of generation of $NO_x$.

For reference, a diagram representing the relation between the air ratio with respect to a theoretical amount of air established by the primary air and the amount of generated $NO_x$ is shown in FIG. 2. As will be apparent from FIG. 2, as the air ratio with respect to a theoretical amount of air established by the primary air is reduced, the amount of generated $NO_x$ is reduced, and when the air ratio is in the range of 0.6–0.8, the amount of generated $NO_x$ is lowest. If the air ratio established by the primary air is further reduced, the amount of unburnt gas increases, and since the proportion of the unburnt gas at the free board increases, an increase of the amount of generated $NO_x$ will result. For these reasons, the air ratio with respect to a theoretical amount of air established by the primary air at the fluidized bed 1 is regulated to be about 0.6–0.8.

Figure 3:
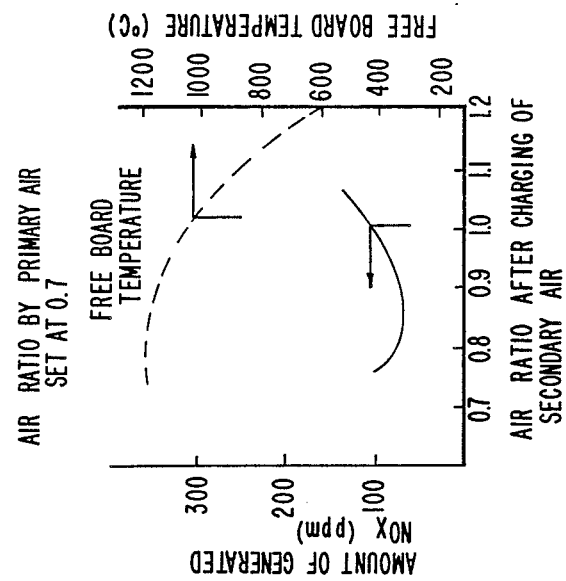
FIG. 3 is a diagram showing relations between an air ratio established after charging of secondary air and an amount of generation of $NO_x$, and between the former and a free board temperature.

Diagrams showing the relations between the air ratio with respect to a theoretical amount of air after charging of the secondary air and the amount of generated $NO_x$ and between the former and the temperature at the free board, where the primary air ratio is assumed to be 0.7, are shown in FIG. 3.

As will be apparent from the diagrams shown in FIG. 3, by regulating the air ratio after charging of the secondary air to be 0.8–1.0, the temperature of the free board which will be a reducing atmosphere will rise, and the amount of generated $NO_x$ will be reduced.

Figure 4:
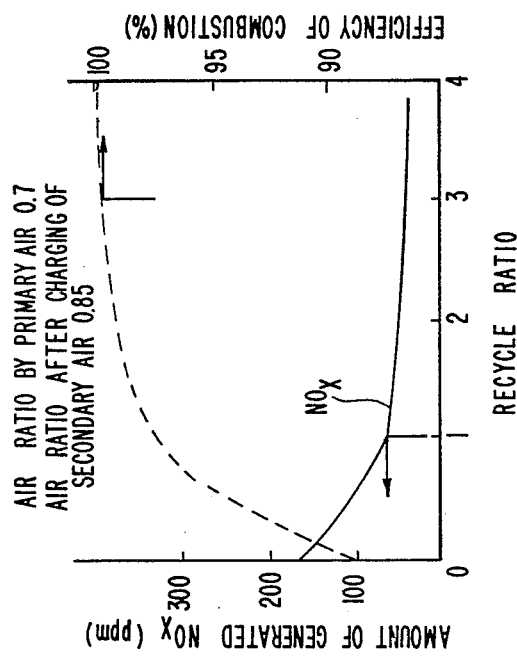
FIG. 4 is a diagram showing relations between a recycle ratio and an amount of generation of $NO_x$, and between the former and an efficiency of combustion.

In addition, in FIG. 4 are diagrams showing the relations between a recycle ratio of unburnt ash and the amount of generated $NO_x$ and between the former and the efficiency of combustion. As will be obvious from the diagrams in FIG. 4, by increasing the recycle ratio, the amount of generated $NO_x$ is lowered, and the efficiency of combustion is increased. It is to be noted that since the effects are nearly saturated at a recycle ratio of 1 or higher, it is desirable to employ a recycle ratio of 1 or higher.

Figure 5:
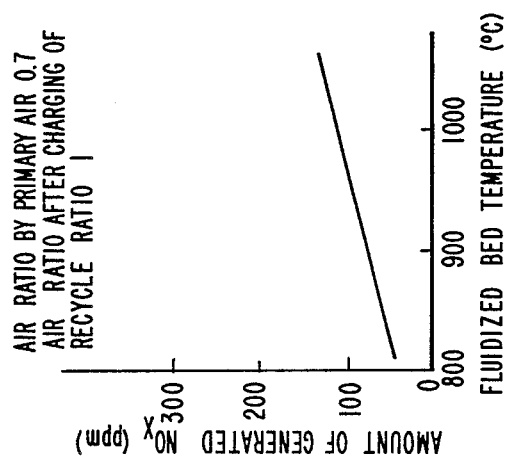
FIG. 5 is a diagram showing a relation between a temperature within a fluidized bed and an amount of generation of $NO_x$.

Furthermore, FIG. 5 shows a diagram representing the relation between the temperature within the fluidized bed and the amount of generated $NO_x$. As will be apparent from the diagram in FIG. 5, as a result of lowering of the fluidized bed temperature, the amount of generated $NO_x$ is lowered. However, if the fluidized bed temperature is excessively lowered, the efficiency of combustion is lowered, and thus the fluidized bed temperature is preferably selected to be 800°–1000° C.

As described in detail above, according to the present invention, an amount of generated $NO_x$ is greatly reduced as compared to the combustion method in the prior art, and the efficiency of combustion is also enhanced. More particularly, the improvements of the invention are represented numerically as follows:

(1) The amount of generated $NO_x$ is lowered, and in the case of burning common coal, such amount is 100 ppm ($O_2$ 6%) or less.

(2) The efficiency of combustion is enhanced up to about 95–99%.

While the principle of the present invention has been described above in connection with one preferred embodiment of the invention, it is a matter of course that many apparently widely different embodiments of the present invention could be made without departing from the spirit of the present invention.

What is claimed is:

1. A method of burning solid fuel such as coal, oil coke, oil shale or the like by means of a fluidized bed, said method comprising the steps of:

feeding primary air through a primary air feed port into said fluidized bed so that the air ratio with respect to a theoretical amount of air required for complete combustion within said fluidized bed will be about 0.6–0.8;

feeding secondary air through a secondary air feed port into a free board downstream of said fluidized bed so that the air ratio with respect to a theoretical amount of air after charging of said secondary air will be about 0.8–1.0; and feeding tertiary air through a tertiary air feed port opening into said free board at a position downstream of said secondary air feed port so that the air ratio with respect to a theoretical amount of air after charging of said tertiary air will be at least about 1.0.

2. A method of burning solid fuel as claimed in claim 1, further comprising recirculating unburnt ash sputtered from said fluidized bed back into said fluidized bed.